Feb. 4, 1936.   O. W. GITHENS   2,029,476
PHOTOGRAPHIC CAMERA
Filed March 10, 1934
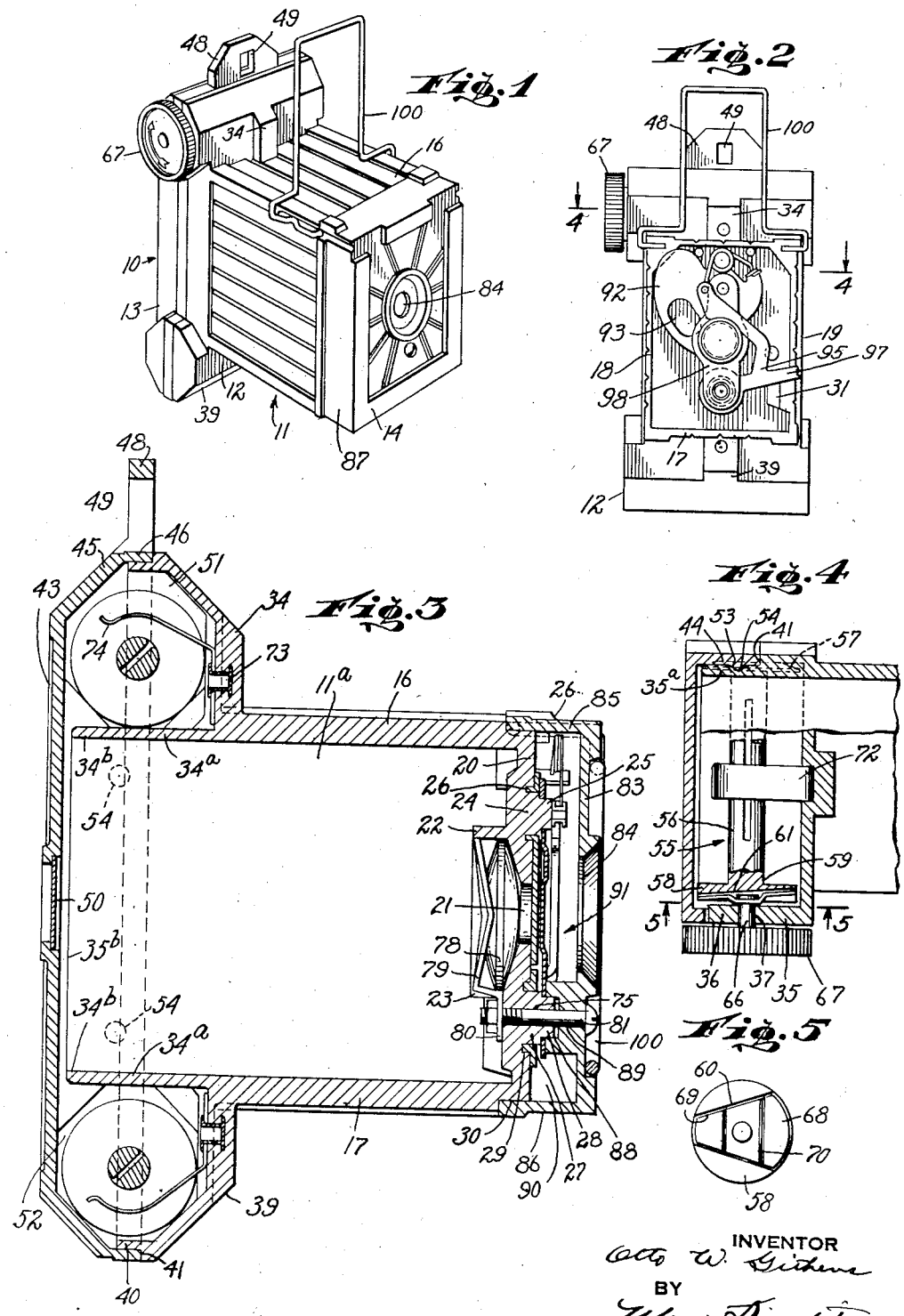

Patented Feb. 4, 1936

2,029,476

UNITED STATES PATENT OFFICE 2,029,476

PHOTOGRAPHIC CAMERA

Otto W. Githens, New York, N. Y., assignor to Universal Camera Corp., New York, N. Y., a corporation of New York Application March 10, 1934, Serial No. 714,909

22 Claims. (Cl. 95—31)

This invention relates to photographic cameras.

An object of this invention is to provide a camera of the character described comprising a casing made of a molded material and having a light chamber and portions integrally extending from said chamber and forming partial film spool receiving chambers and a back cover fitted over the rear of the camera cooperating with the extensions to complete the film spool receiving chambers.

A further object of this invention is to provide a camera of the character described having a front cover fixed to the front end of the light chamber and forming a chamber therewith for the shutter mechanism.

A still further object of this invention is to provide a rugged and neat camera of the non-collapsible type comprising comparatively few and simple parts, which shall be relatively inexpensive to manufacture, and yet practical and efficient to a high degree.

Certain features shown, described and claimed in this application are shown and described but not claimed in my co-pending application, Ser. No. 683,595, filed August 4, 1933, of which the present application is a continuation, in part.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible embodiments of this invention, Fig. 1 is a front perspective view of a camera embodying the invention;

Fig. 2 is a front elevational view of the camera with the front cover removed:

Fig. 3 is a side elevational, cross-sectional view of the camera;

Fig. 4 is a cross-sectional view taken on line 4—4 of Fig. 2; and

Fig. 5 is a cross-sectional view taken on line 5—5 of Fig. 4.

Referring now in detail to the drawing, 10 designates a camera embodying the invention, comprising a casing 11 consisting of three separate members made of molding material. The casing 11 thus comprises a member 12 forming a light chamber 11a and part of the spool receiving chambers, a rear cover 13, and a front cover 14. The member 12 comprises a prismatic portion having a top wall 16, a bottom wall 17, and side walls 18 and 19. Said prismatic portion further comprises a front wall 20 having a central shutter opening 21 and an inwardly extending substantially cylindrical flange 22 open at the bottom as at 23. On the outer face thereof, the front wall 20 is provided with a projection 24 having a reduced portion 25. Said front wall is further formed with a circular groove 26 surrounding the projection 24. The projection 24 is preferably disposed above the opening 21. Below said opening 21, the front wall is formed with a projection 27 having a reduced portion 28. A circular groove 29 formed in said front wall 20 surrounds the projection 27. The outer surface of the wall 20 is further formed at the top, bottom and sides thereof with a shoulder 30 for the purpose hereinafter appearing.

Adjacent one side thereof, the front wall is provided with a recess 31 disposed somewhat above the bottom wall 17. At a point spaced from the rear edge of the top wall 16 is an integral extension 34 forming part of a spool receiving chamber. One of the side walls 35 of said extension 34 is formed with a projecting ear 36, having a bearing opening 37 formed therein. Extending downwardly from the wall 17 is an integral extension 39 substantially similar to the extension 34 and likewise forming part of a spool receiving chamber.

The top and bottom walls 16 and 17 and the side walls 18 and 19 extend rearwardly beyond the integral extensions 34 and 39, as at 34a and 35a and provide top and bottom rear edges 34b for the purpose hereinafter appearing. The rear edges of extensions 34 and 39 are formed with flanges 40 providing shoulders 41. The side walls of said extensions 34, 39 form continuations of the rear extension 35a of side walls 18 and 19.

The rear cover 13 is provided with a back wall 43, side walls 44, and top and bottom walls 45 having edges 46 receiving the flanges 40 and contacting shoulders 41. At the top thereof the back cover 13 is formed with an integral extension or wall 48 parallel to the front wall 20 and provided with a preferably rectangular sight opening 49. The back cover may also be provided with a central, colored disc 50 of transparent material, held within an aperture formed in said back cover.

It will now be understood that film spool receiving chambers 51 and 52 are formed above and below the walls 34a. The extending walls 35a may be formed on the outer sides thereof with sockets or indentations 53 receiving projections 54 formed on the inner surface of the side walls 44. The projections 54 are adapted to snap into said sockets upon applying the rear cover, for holding the same in assembled positions.

Within the upper chambers 51 there is a film spool 55 comprising a spindle 56 adapted to receive a roll of film and formed at the opposite ends thereof with discs 57 and 58. The disc 58 adjacent to ear 36 is provided on the outer surface thereof with a transverse groove 59 forming diverging side surfaces 60. The bottom surface 61 of the groove is in a plane inclined to the axis of the spindle 56. A similar spool may be located within the bottom chamber 52. The film may unwind from the bottom spindle, contact the rear edges 34b and then rewind on the upper spool.

For turning the upper spool 55 there is provided a member 65, comprising a shaft portion 66 extending through the bearing opening 37 and having an integrally formed knob 67 disposed externally of the casing and preferably provided with an outer knurled surface. Fixed to the inner end of said shaft 56 is a member 68 preferably made of sheet metal and having a central opening receiving the inner end of said shaft which is upset to retain said member on said shaft. The member 68 may be generally disposed in a plane parallel to the plane of the bottom surface 61 of the groove 59 and substantially contacts the same, and is formed with inclined edges 69 adapted to engage the diverging surfaces 60 of said groove. The central portion 70 of the member 68 may be depressed rearwardly to provide a space for the projecting end of the shaft 66.

Springs 72 may be attached to the inner surfaces of the extensions 34 and 39 as at 73, having free end portions 74 adapted to contact the rolls of film on the spools.

The front wall 20 of the casing portion 12 is formed with a through opening 75 coaxial with the projection 27. A lens 78 may be received within the split cylindrical extension 22 and held in back of the shutter opening 21 by means of a spring 79 in the form of a ring within said cylindrical portion 22 and having an ear 80 extending through the cut-out portion 23 and clamped to said front wall by means of a bolt 81 extending through the opening 75.

The front cover 14 comprises a front wall 83 having a central opening 84 registering with the shutter opening 21 and with top and bottom walls 85 and 86 and side walls 87. The said top, bottom and side walls are received on the shoulders 30. The front wall is formed with a rearwardly extending boss 88 receiving the projecting portion 28 and formed with a through opening 89 receiving said bolt 81 therethrough. The bolt 81 serves to attach the front cover and the spring 79 to the front wall of the casing porton 12.

The cover 14 forms with the front wall 20 a chamber 90 for the shutter mechanism 91 shown and described in my co-pending application Ser. No. 683,595 filed August 4th, 1933. The shutter mechanism may comprise a shutter member 92 pivoted on the projection 24 and having an opening 93 cooperating with the shutter opening 21. A shutter actuating member 95 is pivoted on a projection 27 and is connected to the shutter by spring 96. The member 95 is provided with a handle 97 extending through a groove in the rear edge of one side wall of the front cover 14 and into the recess 31 in the front wall. A spring and light baffle 98 spans the projections 24 and 27 and cooperates with the shutter 92.

A finder 100 shown, described and claimed in my aforesaid copending application is pivotally mounted on top of the camera for cooperation with the sight opening 49.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth, or shown in the accompanying drawing is to be interpreted as illustrative and not in a limiting sense.

Having thus described my invention, I claim as new and desire to secure by Letters Patent:

1. A camera comprising a casing having a portion forming a light chamber having a shutter aperture at the front and being open at the rear, chambered portions extending from the top and bottom of said first portion adjacent the rear end of the camera, and a back cover for said camera having side walls receiving the rear ends of the side walls of said first portion and having portions complementary to said first mentioned chambered portions to form chambers for film spools, and said back cover being formed with an integral extension formed with a sight opening.

2. A camera comprising a casing formed with a portion having a front wall provided with a shutter aperture, a rear cover for the rear of said camera, film spool chambers formed at the top and bottom of said first portion, and said cover being formed with an integral extension at the top thereof provided with a sight opening.

3. In a camera, a casing having a light chamber portion formed with a front wall having a shutter aperture and being open at the rear, a pair of integral extensions extending from the top and bottom of said portion and adjacent the rear of said portion, each forming part of a chamber for receiving a film spool, and a rear cover for the camera fitted over the rear of the camera, the upper and lower portions whereof cooperate with said extensions to complete the film spool receiving chambers.

4. In a camera, a casing having a light chamber portion formed with a front wall having a shutter aperture, a pair of integral extensions at the top and bottom of said portion and adjacent the rear end of said portion each forming part of a chamber for receiving a film spool, and a rear cover for the camera fitted over the rear of the camera, the upper and lower portions whereof cooperate with said extensions to complete the film spool receiving chambers, said first portion extending forwardly of said extensions and also rearwardly of said extensions and the rearwardly extending portion being received within said rear cover.

5. In a camera, a casing having a light chamber portion formed with a front wall having a shutter aperture, a pair of integral extensions at the top and bottom of said portion and adjacent the rear of said portion each forming part of a chamber for receiving a film spool, and a rear cover for the camera fitted over the rear of the camera, the upper and lower portions whereof cooperate with said extensions to complete the film spool receiving chambers, said first portion extending forwardly of said extensions and also rearwardly of said extensions and the rearwardly extending portion being received within said rear cover, and said rearwardly extending portion having top and bottom parallel rear edges adapted to engage the film passing from one spool to the other and serving as a guide therefor.

6. In a camera, a casing having a light chamber portion formed with a front wall having a shutter aperture and being open at the rear, a pair of integral extensions extending from the top and bottom of said portion and each forming part of a chamber for receiving a film spool, and a rear cover for the camera fitted over the rear of the camera, the upper and lower portions whereof cooperate with said extensions to complete the film spool receiving chambers, said light chamber portion projecting forwardly of said extensions and the rear end of said first portion and said extensions being flanged, and the edge of said cover receiving said flange.

7. A camera casing comprising a prismatic portion having top and bottom walls and side walls, and a front wall and being open at the rear, a pair of chambered portions extending above and below said top and bottom walls each forming half of a film spool receiving chamber, said side, top and bottom walls extending rearwardly of said extensions, and a rear cover for said camera having side walls frictionally engaging the extending portions of the side walls of said prismatic portion, and portions at the top and bottom ends thereof cooperating with said chambered extensions for completing said spool receiving chambers, the rear edges of the extending portions of said top and bottom walls engaging and serving to guide the film passing from one spool to the other.

8. A camera casing comprising a prismatic portion having top and bottom walls and side walls, and a front wall, and being open at the rear, a pair of chambered portions extending above and below said top and bottom walls, each forming half of a film spool receiving chamber, said side, top and bottom walls extending rearwardly of said extensions, and a rear cover for said camera having side walls frictionally engaging the extending portions of the said walls of said prismatic portion, portions at the top and bottom ends thereof cooperating with said chambered extensions for completing said spool receiving chambers, the rear edges of the extending portions of said top and bottom walls engaging and serving to guide the film passing from one spool to the other, and springs within said chambered extensions attached thereto and adapted to contact film on said film spools.

9. A camera comprising a casing having a prismatic portion having top, bottom and side walls, and a front wall, and being open at the rear, extensions integrally formed with said top and bottom walls adjacent the rear ends thereof, each forming substantially half a film spool receiving chamber, a rear cover for said casing cooperating with said chambered extensions to complete said film spool receiving chambers, film spools rotatably mounted within said chambers, a front cover attached to said front wall and forming a chamber therewith for a shutter mechanism.

10. A camera comprising a casing having a light chamber portion open at the rear and having a front wall, chambered portions extending from the top and bottom of said light chamber portion adjacent the rear end of the camera, and a back cover for said camera having side walls receiving the rear ends of the side walls of said light chamber portion and having portions complementary to said first mentioned chambered portions to form chambers for film spools, film spools within said chambers, and a member attached to said front wall and forming therewith a chamber for a shutter mechanism.

11. A camera comprising a casing having a prismatic portion open at the rear, chambered portions extending from the top and bottom of said prismatic portion adjacent the rear end of the casing, and a back cover for said camera having side walls receiving the rear ends of the side wall of said prismatic portion and having portions complementary to said first mentioned chambered portions to form chambers for film spools, film spools within said chambers, said film spools having circular heads at the ends thereof and said chambered portions and cover having inclined walls contacting said heads.

12. A camera comprising a casing having a light chamber portion open at the rear, chambered portions extending from the top and bottom of said first portion adjacent the rear end of the casing, and a back cover for said camera having walls receiving the lower ends of said first portion and having portions complementary to said first mentioned chambered portions to form chambers for film spools having circular end discs, film spools within said chambers, said chambers contacting said discs for rotatably supporting said spools, and springs attached to said chambered portions adapted to contact the film on said spools.

13. In a camera, a casing having a prismatic portion formed with a front wall, top and bottom walls, and side walls, and being open at the rear, a pair of integral extensions extending from the top and bottom walls adjacent the rear thereof, and each forming part of a chamber for receiving a film spool, and a rear cover for the camera fitted over the rear of the camera, the upper and lower portions whereof cooperate with said extensions to complete the film spool receiving chamber.

14. In a camera, a casing having a prismatic portion formed with a front wall, top and bottom walls, and side walls, a pair of extensions extending from the top and bottom walls and each forming part of a chamber for receiving a film spool, and a rear cover for the camera fitted over the rear of the camera, the upper and lower portions whereof cooperate with said extensions to complete the film spool receiving chambers, said top, bottom and side walls of said prismatic portion extending forwardly of said extensions and also rearwardly of said extensions and the rearwardly extending portion being received within said rear cover and being formed with shoulders on the outer surface, contacted by edge portions of said rear cover.

15. A camera comprising a casing made of molded material and having a light chamber portion formed with a front wall, integral extensions at the top and bottom of the light chamber portion and adjacent the rear end thereof, each forming a part of a spool chamber, said light chamber portion extending rearwardly also of said extensions, a rear cover for closing the rear end of the light chamber and having portions cooperating with said extensions to complete the spool chambers and receiving the rearwardly projecting portion of the light chamber portion, said rearwardly projecting portion and said cover having snap projection and socket means for removably securing the back cover.

16. A camera comprising a casing having a portion forming a light chamber provided with a shutter aperture at the front and being open at the rear, chambered portions extending from the top and bottom of said first portion and a back cover for said camera having side walls receiving the rear ends of the side walls of said first portion and having portions complementary to said first mentioned chambered portions for form chambers for film spools, and a sight on said back cover.

17. A camera comprising a casing formed with a portion having a front wall provided with a lens opening, a rear cover for the rear of the camera, film spool chambers formed at the top and bottom of said casing, said cover having a sight opening at the top thereof projecting above the top spool chamber.

18. A camera comprising a casing having a light chamber portion open at the rear and having a front wall, chambered portions extending from the top and bottom of said prismatic portion adjacent the rear end of the camera, a back cover for said camera having side walls receiving the rear ends of the side walls of said light chamber portion and having portions complementary to said first mentioned chambered portions to form chambers for film spools, film spools within said chambers, a member attached to said front wall and forming therewith a chamber for a shutter mechanism, said front wall having a lens opening and said member having an opening aligned with said lens opening.

19. In a camera, a casing having a prismatic portion formed with a front wall, top and bottom walls, and side walls, and being open at the rear, a pair of integral extensions extending from the top and bottom walls adjacent the rear thereof and each forming part of a chamber for receiving a film spool, and a rear cover for the camera fitted over the rear of the camera, the upper and lower portions whereof cooperate with said extensions to complete the film spool receiving chamber, and a sight on the upper portion of said cover.

20. In a camera, a casing having a prismatic portion formed with a front wall, top and bottom walls, and side walls, a pair of extensions extending from the top and bottom walls and each forming part of a chamber for receiving a film spool, and a rear cover for the camera fitted over the rear of the camera, the upper and lower portions whereof cooperate with said extensions to complete the film spool receiving chambers, said top, bottom and side walls of said prismatic portion extending forwardly of said extensions and also rearwardly of said extensions and said rearwardly extending portions being received within said rear cover, and being formed with shoulders on the outer surface contacted by edge portions of said rear cover, and a member at the front of the camera forming with said front wall a chamber for a shutter mechanism.

21. A camera comprising a casing made of three parts of molded material, the first part having a chamber portion formed with a front wall having a lens aperture and extensions at the top and bottom rear portions of said light chamber portion each forming a part of a film spool chamber, the second part comprising a rear cover having portions at the top and bottom thereof cooperating with said extensions to complete the film spool receiving chambers, and the third part comprising a member attached to the front wall of the light chamber portion and forming therewith a chamber for the shutter mechanism, said third part being formed with an opening aligned with the lens aperture.

22. A camera comprising a casing made of three parts of molded material, the first part having a chamber portion formed with a front wall having a lens aperture and extensions at the top and bottom rear portions of said light chamber portion each forming a part of a film spool chamber, the second part comprising a rear cover having portions at the top and bottom thereof cooperating with said extensions to complete the film spool receiving chambers, and the third part comprising a member attached to the front wall of the light chamber portion and forming therewith a chamber for the shutter mechanism, said third part being formed with an opening aligned with the lens aperture, said light chamber portion extending also rearwardly of said extensions and being formed with top and bottom edges, film spools within the film spool chambers and said edges being adapted to guide the film extending from one film spool to the other.

OTTO W. GITHENS.